United States Patent [19]

Dumoulin et al.

[11] 3,789,083
[45] Jan. 29, 1974

[54] PROCESS FOR THE PREPARATION OF VINYL CHLORIDE POLYMERS GRAFTED ON POLYMERS OF ETHYLENE

[75] Inventors: Joseph Dumoulin, Wezembeek-Oppem; Marc Obsomer, Brussels, both of Belgium

[73] Assignee: Solvay & Cie, Brussels, Belgium

[22] Filed: July 6, 1971

[21] Appl. No.: 160,100

[30] Foreign Application Priority Data

| Date | Country | Number |
|---|---|---|
| July 6, 1970 | France | 70.25058 |
| May 11, 1971 | France | 71.17076 |
| May 11, 1971 | France | 71.17077 |
| May 25, 1971 | France | 71.18971 |

[52] U.S. Cl............260/878, 260/23 XA, 260/23.3, 260/26.9 RB, 260/45.7 P, 260/884, 260/889, 260/897 C
[51] Int. Cl............. C08f 3/04, C08f 3/20
[58] Field of Search 260/29.6 R, 878 R, 876, 897 C, 260/884, 29.6 CM, 29.6 RB

[56] References Cited
UNITED STATES PATENTS

| | | | |
|---|---|---|---|
| 3,322,858 | 5/1967 | Coaker et al. | 260/878 R |
| 3,432,576 | 3/1969 | Beer | 260/876 R |
| 2,947,719 | 8/1960 | Rugg et al. | 260/878 R |

FOREIGN PATENTS OR APPLICATIONS

| | | | |
|---|---|---|---|
| 652,069 | 8/1964 | Belgium | 260/878 |
| 657,762 | 12/1964 | Belgium | 260/878 |

*Primary Examiner*—Murray Tillman
*Assistant Examiner*—J. Ziegler
*Attorney, Agent, or Firm*—Robert E. Burns & Emmanuel J. Lobato

[57] ABSTRACT

Grafted polymers of vinyl chloride are prepared by polymerizing or copolymerizing vinyl chloride in the presence of an ethylene backbone polymer composed of polyethylene an ethylene copolymer or mixture thereof which has a fusion index $\leq$ 250, from 0.2 to 4 double bonds per 1000 carbon atoms and/or from 5 to 30 methyl groups per 1,000 carbon atoms, under a partial pressure of vinyl chloride which is lower at all times during the polymerization than the saturated vapor pressure of vinyl chloride at the temperature of polymerization. Homogeneous products having a high degree of grafting and excellent thermal resistance and which provide in combination with polymers of vinyl chloride, compositions having improved resistance to shock, excellent transparency and processibility, are obtained by this process.

11 Claims, No Drawings

PROCESS FOR THE PREPARATION OF VINYL CHLORIDE POLYMERS GRAFTED ON POLYMERS OF ETHYLENE

BACKGROUND OF THE INVENTION

The present invention relates to a process for obtaining homogeneous grafted polymers from ethylene polymers and vinyl chloride polymers which are particularly useful for applications requiring high transparency and shock resistance. The present invention also concerns mixtures of these grafted polymers with poly(vinyl chloride).

Resin mixtures with a base of poly(vinyl chloride) and polyethylene are of substantial interest in many well known fields and the combination of these two polymers has been attempted by various means. The incompatibility of poly(vinyl chloride) and polyolefins is an old problem. It is well known that the mechanical mixing of these two polymers does not yield homogeneous products and consequently, in such mixtures the desirable properties of these polymers are reduced.

Various means have been proposed to improve the compatibility of these two resins. In particular, the polymerization of vinyl chloride in the presence of polyethylene dissolved in various solvents has been disclosed in U.S. Pat. No. 2,947,719 of Sept. 9, 1954. However, the use of solvents decreases the grafting efficiency and alters the physical properties of the resultant products.

Accordingly procedures whereby the use of solvents are avoided have been tried, but have not resulted in a solution to the problem in view of the fact that the polymerizations have to be effected at high temperatures in the absence of solvents and the products obtained still have undesirable properties.

The polymerization of vinyl chloride in an aqueous suspension in the presence of finely divided polyethylene and in the presence of reprecipitated polyethylene has been disclosed in Belgian Pat. No. 652,069 of Aug. 20, 1964 and Belgian Pat. No. 657,762, of Dec. 30, 1964, both issued to Monsanto. However, these processes have serious drawbacks from both an economic and technological point of view. The use of finely divided polyethylene is costly; it requires the supplemental operations of reprecipitation, or the grinding or crushing of the polyethylene. On the other hand, when the polymerization is carried out in the presence of polyethylene in the solid state, e.g. in particles of relatively large size, the products obtained by means of the classical, usual processes of polymerization and particularly in aqueous suspension, have a heterogeneous structure. In addition to the fact that vinyl chloride is polymerized in the gel phase in polyethylene, it also forms homopolymeric poly(vinyl chloride) in aqueous suspension. When homopolymeric poly(vinyl chloride) forms, it is necessary to carry out the polymerization of vinyl chloride in the presence of finely divided polyethylene in order to obtain products having a homogeneous granulometry.

In addition to the above, suspension polymerization and bulk polymerization results in the formation of build up in the polymerization autoclaves which is a source of serious problems, particularly with respect to the efficiency of polymerization and contamination of the finished products.

SUMMARY OF THE INVENTION

A method has now been discovered for obtaining grafted polymers of vinyl chloride and polyethylene and/or copolymers of ethylene containing a minor quantity of another olefin, whereby the problems and difficulties discussed above are avoided.

According to the present invention, grafted polymers of vinyl chloride are obtained by polymerizing or copolymerizing vinyl chloride in the presence of an ethylene trunk polymer composed of polyethylene and/or a copolymer of ethylene with a minor quantity of another olefin, in which the ethylene polymer has a fusion index equal to or less then 250, and at least one characteristic selected from 0.2 to 4 double bonds per thousand carbon atoms and 5 to 30 methyl groups per thousand carbon atoms and under a partial pressure of vinyl chloride which at all times during the polymerization or copolymerization is below that of the saturated vapor pressure of vinyl chloride at the temperature of polymerization.

By means of the present process, grafted polymers of vinyl chloride and an ethylene polymer having high proportions of grafting, composed of a single type of granules of a similar nature and composition and having a homogeneous structure, are obtained.

DESCRIPTION OF THE INVENTION

According to the present process, the grafting polymerization of vinyl chloride on a backbone or trunk polymer of ethylene is carried out at a temperature of about 40° to 110°C. If the polymerization is carried out at a temperature above 110°C., the grafted products as initially obtained have pronounced color due to the deterioration of the polymer.

The present process of polymerization may be carried out in aqueous suspension or in bulk in the absence of water.

The vinyl chloride/trunk polymer ratio in the polymerization medium is not critical, providing that the partial pressure of vinyl chloride in the polymerization autoclave is at all times below that of the saturated vapor pressure of the vinyl chloride at the temperature of polymerization. In accordance with the present invention, the polymerization is carried out so that the vinyl chloride introduced into the polymerization mixture is almost completely absorbed by the trunk polymer and hence is polymerized in direct contact therewith. Accordingly, the vinyl chloride/trunk polymer ratio depends on the nature of the trunk polymer and more particularly on its capacity for absorbing vinyl chloride.

By carrying out the polymerization in this manner, the grafting efficiency is improved and the formation of homopolymeric vinyl chloride outside the particles of the trunk polymer is avoided. The grafting efficiency is defined by the following relationship:

[g. of grafted trunk polymer/g. of polymerized poly(vinyl chloride)]× 100

The process of the present invention is in essence distinguished from prior processes due to the fact that in the known processes, the vinyl chloride/trunk polymer ratio is greater than that corresponding to that of the saturation of the grains of trunk polymer and, consequently, heterogeneous products are obtained because the non-absorbed vinyl chloride forms homopolymeric poly(vinyl chloride) outside of the grains of the polymer trunk. Moreover, the formation of homopolymeric poly(vinyl chloride) considerably reduces the grafting efficiency.

In the process of the invention substantially all of the vinyl chloride introduced into the polymerization reaction is polymerized in direct contact with the polyethylene trunk polymer, which thereby results in an increase in the grafting efficiency.

It has also been found that during the course of polymerization, the particles of polyethylene are capable of rapidly absorbing additional quantities of vinyl chloride. Thus, by continuously or discontinuously introducing supplemental quantities of vinyl chloride during the polymerization, and optionally a catalyst, quantities of vinyl chloride greater than those which correspond to the initial saturation of the polyethylene trunk polymer by vinyl chloride may be polymerized in contact with or inside the particles of polyethylene. However, the supplemental additions of vinyl chloride are such that the partial pressure of vinyl chloride in the polymerization reactor is always to be maintained at a pressure which is below the saturated vapor pressure of vinyl chloride at the temperature of polymerization. By carrying out the operation in this manner, the proportion of grafting of the polymer trunk, i.e. on the backbone polymer, is increased.

The grafting efficiency and the proportion of grafting are also increased when the ratio of vinyl chloride/polymer trunk is reduced. Thus, such techniques, i.e. the introduction of supplemental quantities of vinyl chloride during the polymerization, are particularly interesting when trunk polymers are used which have a relatively low absorption capacity for vinyl chloride.

The quantity of vinyl chloride which may be absorbed by the backbone polymer depends on the nature of the backbone polymer, To determine the maximum quantity that may be used, vinyl chloride in an aqueous suspension of polyethylene is continuously introduced. At the same time the pressure increases continuously and the maximum quantity absorbed is reached when the pressure stops increasing.

All polyethylenes and ethylene copolymers containing 0.4 to 6 mole percent of an alpha olefin such as propene, butene and hexene, capable of being swelled by vinyl chloride at a temperature of 40° to 110° C and which meet the following requirements, can be used in accordance with the process of the present invention:

A fusion index (ASTM D 1238–57 T) equal to or lower than 250 and preferably between 0.1 and 200.

The number of double bonds per 100 carbon atoms is from 0.2 to 4, determined by infra-red spectrophotometry, and/or The number of methyl groups per 1,000 carbon atoms is from 5 to 30, as determined by infra-red spectrophotometry.

6 mole percent is the maximum quantity of comonomer corresponding to the maximum value of the number (30) of methyl groups in the backbone polymer.

It is preferred to employ polyethylenes having a low or medium density, that is, a density of about 0.910 to 0.955, and especially products manufactured by the process commonly known as "high pressure."

Such polyethylenes are for example, disclosed in British Pat. Specification 471590 of Imperial Chemical Industries. However, polymers of ethylene obtained by low pressure processes such as that disclosed in French Pat. No. 1,466,376 of Apr. 11, 1965, issued to Solvay & Cie, S.A., are also suitable for carrying out the invention. The foregoing patent, as well as other publications mentioned herein are incorporated by reference.

The products obtained in accordance with the present invention may contain almost any quantity of grafted polymer. However, the products of the present invention generallly contain from about 25 to 75 percent of grafted polymer, the balance being composed of non-grafted polyvinyl chloride and unmodified polyethylene when the initial trunk polymer is in granular or powder form. Non-grafted poly(vinyl chloride) and unmodified polyethylene are generally found in proportions of about 40 to 60 percent of the total of the non-grafted products.

The present process is particularly interesting for preparing resins wherein the total quantity of ethylene, which may be modified or not, is about 25 to 99 percent by weight of the final product and more particularly, from about 30 to 70 percent by weight when the initial polyethylene trunk polymer is in granular form, i.e. powder, fluff, granules and the like, and from 80 to 99 percent by weight when the grafting of vinyl chloride is carried out on finished polyethylene objects such as fibers, films, plates, etc.

The incorporation of the grafted products obtained in accordance with the present invention and in particular mixtures thereof with poly(vinyl chloride) have substantially improved resistance to shock. The transparency and resistance to shock of mixtures containing grafted resins of the present invention are clearly higher than those of corresponding mixtures which do not contain a grafted polymer but which contain an equivalent proportion of the trunk polymer. Compositions containing from 1 to 25 parts and more preferably from 5 to 20 parts of the grafted product of the present invention per 100 parts of poly(vinyl chloride) are particularly useful.

By employing ethylene trunk polymers having a fusion index of about 0.3 to 40, grafted polymers having a highly desirable proportion of grafting are obtained, for example about 40 percent to about 60 percent.

When a trunk polymer having a fusion index equal to or lower than 0.3 is used, a further increase in the proportion of grafting may be obtained and consequently, the quantity of unmodified ethylene polymer in the grafted products may be reduced. Thus, polymers of ethylene having a fusion index between about 0.1 and 0.3 are particularly suitable for obtaining resins having a high proportion of grafting.

Polymers having a fusion index lower than about 0.05 and in some cases lower than 0.1 are not often suitable for use in the present process in view of the fact that they are not especially capable of absorbing a sufficient quantity of monomer so as to expand under the conditions of polymerization or of reacting under the grafting conditions.

By carrying out the grafting operation in accordance with the invention, the compatibility of compositions which contain such grafted resins and poly(vinyl chloride) is increased, whereby compositions of excellent transparency are obtained. Also as a result of the improvement of compatibility a very high quantity of grafted polymers may be incorporated with poly(vinyl chloride) whereby compositions having still further improved resistance to shock and at the same time excellent transparency are obtained.

By using an ethylene polymer having a fusion index equal to or greater than 40 and equal to or lower than 250 and, preferably, between about 40 and 200, as the trunk polymer, grafted polymers may be obtained which when combined with poly(vinyl chloride) provide compositions having greatly reduced viscosity in melted form. Compositions of this type may be worked at relatively low temperatures. Moreover, these compositions have excellent thermal stability and a good initial coloration. In addition, when working with such compositions, due to the reduced viscosity, the productivity may be increased without risk of deterioration of the polymer. These compositions also have good transparency and resistance to shock.

Ethylene polymers which have a fusion index greater than 250 are generally not suitable for the purposes of the present invention in view of the fact that combinations thereof with poly (vinyl chloride) only very slightly improve the mechanical properties and particularly the resistance to shock of the vinyl chloride polymer.

Polymers of ethylene in almost any form may be used in the process of the present invention, and in particular, the polyethylene may be in the form of powder, granules, fluff, fibers, plates, films, other finished objects and the like. Preferably the ethylene trunk polymer is employed in the form of fluff or gelled granules having an average granulometry of about 1 to 10 mm. and preferably of 3 to 8 mm. The proportion of ethylene trunk polymer and vinyl chloride used in the process varies according to the type of grafted polymer desired as well as the absorption capability of the polyethylene.

Catalysts and catalytic systems which generate free radicals and are soluble in vinyl chloride which are in general use for the polymerization of vinyl chloride may be used in the present process. The quantity of catalyst is preferably about 0.01 to 5 percent by weight based on the amount of monomer in the reaction. The catalysts may be introduced into the reaction mixture in solid form, in a solution of the vinyl chloride or solvent used to expand the polyethylene. The process of the present invention may be carried out in the presence of water as the liquid dispersion medium or without water.

When the grafting operation is carried out in the presence of water, it is preferable to incorporate in the reaction, the additives usually employed in the art of aqueous suspension polymerization. As suspension agents, materials which have a good wetting effect with respect to the trunk polymer are used including macromolecular colloids, ionic and non-ionic surface active agents. By carrying out the grafting process in accordance with the present invention, the formation of poly(vinyl chloride) in aqueous suspension may be avoided.

Agitation of the reaction medium does not have any effect on the characteristics of the polymer particles which are formed; it influences only the kinetics of absorption of the vinyl chloride by the trunk polymer. The reaction medium is therefore subject to continuous agitation by means of effective agitators driven at appropriate speeds.

In accordance with a particular embodiment of the present process, the grafting polymerization reaction may be carried out in the absence of water by employing a suitable apparatus which provides good agitation of the reaction medium, particularly an apparatus such as a vertical autoclave with strap agitators, a fluid bed reactor and the like. Products obtained by means of this technique do not require washing or drying and have a high degree of purity due to the absence of dispersion agents which contaminate the polymers during polymerization.

Any known suspension agent may be used. Suitable suspension agents are disclosed in H. KAINER — Polyvinylchlorid und Vinylchlorid — Mischpolymerisate — Springer Verlag — 1965 p. 12–34.

Resins having improved stabilization may also be obtained by means of the present process by incorporating in the reaction medium, either before or during the polymerization reaction, one or more of the usual stabilizers of poly(vinyl chloride). This procedure assures that the stabilizer is well dispersed in the resin and thereby provides a high stabilizing efficiency of the stabilizing agent.

The present process may also be used for the copolymerization of vinyl chloride with other polymerizable monomers such as vinylidene chloride, ethylene, propylene and the like. The maximum quantity of comonomer is 30 percent by weight. Suitable comonomers are vinyl esters such as vinyl acetate; acrylic and methacrylic esters such as alkyl acrylates and methacrylates; vinylidene halogenides such as vinylidene chloride; alpha olefins such as ethylene, propene, butene and hexene.

Grafted polymers including the above-mentioned grafted copolymers obtained in accordance with the present process have a high proportion of grafting. When such products are incorporated with other resins and particularly with vinyl chloride polymers, the compositions have substantially improved resistance to shock. The transparency and resistance to shock of the mixtures containing the presently grafted polymers are clearly greater than those of corresponding mixtures containing an equal proportion of the trunk polymer, but which do not contain a grafted trunk polymer, prepared in accordance with the present invention.

By polymers of vinyl chloride, which when mixed with the presently grafted polymers provide compositions having especially desirable characteristics, it meant homopolymers of vinyl chloride and copolymers of vinyl chloride containing less than 50 percent of a copolymerizable monomer and also postchlorinated polymers particularly postchlorinated poly(vinyl chloride) which contains from about 600 to 750 grams of chlorine per kilogram.

Moreover, by incorporating the present grafted product in compositions with other resins such as poly(vinyl chloride), the use of "processing-aids" and reinforcing agents which are well known in the art and which are commonly employed at the present time may be eliminated, i.e. components such as the methylmethacrylate ethylacrylate copolymers of ethyl and methyl acrylates (PARALOID K 12ON) finely, divided low density polyethylenes (MICROTHENES FN 500 and MN 1710) as well as the grafted polymers obtained by grafting monomers such as methyl methacrylate, styrene, acrylonitrile, etc. on a polymer of butadiene (KUREHA BTA III).

Compositions based on poly(vinyl chloride) having a high molecular weight and also containing the grafted polymers of the present invention may be easily transformed into bottles or other forms without deterioration of the excellent properties of the composition mentioned above. In addition, the usual addition of a reinforcing agent customarily utilized may be eliminated, which has not been possible up to the present time, in view of the fact that the polymer has been degraded when it is processed. By poly(vinyl chloride) having a high molecular weight is meant the polymers which have a Fikentscher K number measured in 1,2-dichloroethane above 57 and more specifically of 58 to 67.

On the other hand, compositions composed of the presently grafted polymers and poly(vinyl chloride) having a low molecular weight, i.e., a K number below 57 and more specifically of 52 to 55, allow a higher productivity of industrial molding machines.

It is also particularly useful to obtain grafted products in finely divided form; in view of the fact that in such form, the incorporation of customary additives and the use of premixes is facilitated.

When the grafting polymerization procedure disclosed herein is carried out at a temperature of about 80° to 110°C., finely divided grafted products may be obtained directly without supplemental separation operations starting with polyethylene in granular form. It is indeed surprising in the light of the results of standard processes for polymerizing vinyl chloride in suspension, in emulsion, or in bulk or mass, that the present process of graft polymerization may be carried out at temperatures of about 80° to 110°C. to provide uncolored grafted products having a high proportion of grafting and good thermal stability. Moreover, the grafted polymers obtained according to the present process improve the fluidity of mixtures in melted form which contain polymers of vinyl chloride. Consequently, these compositions may be processed with greater facility at lower temperatures than those customarily required. Accordingly, the characteristics of such compositions make it possible to obtain finished products having excellent thermal stability and good initial color. Compositions containing the present grafted product also retain the properties of good transparency and resistance to shock mentioned above.

By means of this technique, grafted products having a granulometry lower than 1 mm. may be obtained starting with a backbone polymer having a granulometry of from 2 to 10 mm. and preferably from 3 to 4 mm. The granulometry of the particles is determined by sieving with calibrated sieves. By selecting suitable operating conditions, and in particular the type of backbone polymer, the vinyl chloride/backbone polymer, the fineness of the grains of the grafted product may be regulated, and in particular, products with a granulometry of between 50 and 1,000$\mu$, and preferably on the order of 100$\mu$ may be obtained. For operating temperatures of about 90° to 100° C. and for the backbone polymers CR shown in Table 1, it is desirable to operate with a ratio of vinyl chloride/backbone polymer respectively of 1.5 to 1.

By means of the process of the present invention, homogeneous grafted polymers are obtained, the efficiency of grafting is improved and in addition, the process is economical due to the absence of build-up in the polymerization reactor. Moreover, the proportion of effective filling of resin in the polymerization reactor increases with the granulometry of the backbone polymer employed.

The characteristics of the grafted polymers cited above yield materials of choice for numerous applications in particular, for the production of corrugated or flat plates, sheets, containers, and the like.

The polymers of ethylene used in the examples described hereinafter are set forth in Table 1.

TABLE 1

Characteristics of Polyethylene Polymers

| Designation | Polymer Trunk Nature | Polymer Trunk Form | Index of Fusion (g./10 min.) ASTM D 1238-57 T | Specific Weight (g./cm.$^3$) ASTM D 1505-57 T | Granulometry (mm.) | No. of double bonds per 1000 C | Number of methyl groups per 1000 C |
|---|---|---|---|---|---|---|---|
| | | | | | | Measured by infra-red spectrophotometry | |
| A | Polyethylene low density | Microspheres obtained by reprecipitation | 22 | 0.915 | <0.02 | 0.61 | 16 |
| B | Polyethylene low density | Powder obtained by grinding | 22 | 0.916 | <0.3 | 0.73 | 17 |
| C | Polyethylene low density | Granules extruded | 21 | 0.919 | <4.7 | 0.64 | 16 |
| D | Ethylene/butene copolymer | Fluff | 2.2 | 0.926 | <2.5 | 0.21 | 15 |
| E | Ethylene/butene copolymer | Fluff | 30 | 0.955 | <2 | 0.20 | 5 |
| F | Polyethylene high density | Fluff | 3.7 | 0.96 | <2 | 1.65 | 0 |
| G | Polyethylene high density | Fluff | 0.25 | 0.958 | <1 | 0.17 | 1 |
| K | | Powder obtained by grinding | 70 | 0.914 | <0.3 | 0.59 | 18 |
| L | Polyethylene | grinding | 200 | 0.913 | <0.3 | 0.60 | 20 |
| M | low | | 0.25 | 0.925 | 3 to 4 | 0.4 | 12 |
| N | density | | 0.29 | 0.922 | 3 to 4 | 0.45 | 13 |
| O | | Granules | 2 | 0.918 | 3 to 4 | 0.57 | 14 |
| P | | extruded | 7 | 0.917 | 3 to 4 | 0.49 | 17 |
| R | | | 70 | 0.914 | 3 to 4 | 0.59 | 18 |

The following examples, except for those examples identified by a number and the letter R, further illustrate the best mode currently contemplated for carrying out the invention. However, the illustrative examples must not be construed as limiting the invention in any manner. Examples preceded by the letter R are reference examples which have been included for the purpose of comparison. Unless otherwise noted, all parts are by weight.

EXAMPLES 1 to 6

In an autoclave of 5 l., subjected to a continuous agitation (450 revolutions per minute), with the aid of a two-blade agitator inclined at 45°, the following is introduced: water, suspension agent and polyethylene in the proportions set forth in Table III. After the introduction of the catalyst, the vinyl chloride is introduced in such a quantity that at the temperature of polymerization (68°C.), the partial pressure of the vinyl chloride is lower than the saturated vapor pressure of vinyl chloride at 68°C., namely, 11.6 kg./cm.$^2$. When the pressure has dropped to at least half its maximum value, the non-transformed gaseous vinyl chloride is removed. After filtering, washing and drying, the product obtained is collected. The quantities given in all examples are parts by weight.

No crusting is observed on the walls of the reactor. The proportion of grafting ($\tau$) of the polymers which are obtained is determined in the following manner:

The non-grafted trunk polymer is extracted with cyclohexane when the trunk polymer is completely soluble in this solvent; when the trunk polymer is insoluble in cyclohexane, separation is effected by means of gel chromatography.

The proportion of grafting is then calculated in accordance with the following formula, $\tau = A\text{-}B/A \times 100$, in which A is the total weight of the trunk polymer in the sample and B is the weight of the non-grafted trunk polymer.

The characteristics of the polyethylenes employed as the polymer trunk are given in Table 1; and those of the grafted products obtained are set forth in Table 2.

TABLE 2

| | | | | Granulometry, g./kg. | | | | |
|---|---|---|---|---|---|---|---|---|
| Size of the Particles mm. | Polyethylene A | Polymers obtained in examples | | Polyethylene B | Polymers obtained in examples | | Polyethylene C | Polymers obtained in examples | |
| | | 1 | R2 | | 3 | R4 | | 5 | 6 |
| <0.043 | 1000 | 186 | 97 | | | | | | |
| <0.089 | | 566 | 131 | | | | | | |
| <0.125 | | 693 | 151 | | | | | | |
| <0.175 | | 778 | 193 | | | | | | |
| <0.246 | | 813 | 246 | | | | | | |
| <0.295 | | 827 | 300 | 1000 | 916 | 849 | | | |
| <0.351 | | 837 | 361 | | 988 | 985 | | | |
| <0.417 | | 845 | 444 | | 992 | 991 | | | |
| <0.495 | | 852 | 537 | | 995 | 993 | | | |
| <0.589 | | 859 | 620 | | 999 | 995 | | | |
| <0.710 | | 863 | 695 | | 1000 | 996 | | | |
| <0.833 | | 867 | 745 | | | 997 | | | |
| <1 | | 872 | 810 | | | 999 | | | |
| <1.397 | | 899 | 914 | | | 1000 | | | |
| <1.981 | | 955 | 985 | | | | | | |
| <2.794 | | 998 | 998 | | | | 8 | 2 | 2 |
| <3.327 | | 999 | 999 | | | | 115 | 5 | 6 |
| <4.699 | | 1000 | 1000 | | | | 1000 | 995 | 996 |
| <6.73 | | — | — | | | | | 1000 | 1000 |

Table 3

| Constituents, parts by weight | Examples | 1 | R2 | 3 | R4 | 5 | 6 |
|---|---|---|---|---|---|---|---|
| Vinyl chloride | | | | 500 | | | |
| Polyethylene | | | | | | | |
| A | | 500 | | | | | |
| B | | | | 500 | | | |
| C | | | | | | | 500 |
| Water | | | | 1750 | | | |
| Poly(vinyl alcohol) | | 9 | 0.9 | 0.9 | 0.45 | 0.9 | 0.18 |
| Lauroyl peroxide | | | | 1.5 | | | |
| Temperature of polymerization, °C. | | | | 68 | | | |
| Period of reaction, hours | | 4 | 6.25 | 5 | 3 | 3.5 | 3 |
| Yield of the polymerization, % | | 70 | 75 | 92.5 | 88 | 90 | 86 |
| Proportion of grafting of PE, % | | 43 | 37 | 44 | 41 | 45 | 47 |

The examples preceded by the letter R are comparative examples in which the pressure reaches the saturated vapor pressure of the vinyl chloride during at least a part of the polymerization.

In connection with Examples 1, 3, 5 and 6, it has been found that contrary to the classical procedures of polymerizing vinyl chloride in aqueous suspension, the pressure at the start of the polymerization reaction is not level; instead the pressure drops immediately as soon as the reaction temperature is reached. This phenomenon clearly indicates that the vinyl chloride has been substantially absorbed by the backbone polymer; no vinyl chloride polymerizes in aqueous suspension outside of the polyethylene granules.

Thus, the amount of suspension agent was sufficient for permitting a correct dispersion of the backbone polymer in the liquid phase and for ensuring a fast absorption of vinyl chloride by polyethylene. The amount of suspension agent is different according to the granulometry of the backbone polymer used.

In connection with the comparative examples R2 and R4, the level of partial pressure of vinyl chloride in the autoclave was equal to the saturated vapor pressure of vinyl chloride at 68°C. for a period of more than two hours (Example R2) and over a period of more than 30 minutes (Example R4).

The amount of poly(vinyl alcohol) was insufficient for correctly dispersing the polyethylene in the liquid phase. Consequently, the absorption of vinyl chloride is too slow and homopolymerization of vinyl chloride already occurs in aqueous suspension outside of the polyethylene granules.

The average granulometry of the products which were obtained in accordance with Examples R2 and R4 is higher than that of the products obtained in Examples 1 and 3, respectively, which indicates the presence of agglomerates.

The process according to the present invention makes it possible to reduce considerably the amount of suspension agent required to assure good dispersion of the backbone polymer and a rapid absorption of the vinyl chloride when the backbone polymer is in the form of granules, as shown in Examples 5 and 6.

EXAMPLE 7

Polymerization is carried out according to the same technique described in Examples 1 to 6 and in the presence of the components of Example 5, but by adding supplemental quantities of vinyl chloride during the course of polymerization.

As soon as the pressure in the autoclave has dropped to 9.5 kg./cm.$^2$, an additional 50 cc. (33 parts) of vinyl chloride are introduced. The same operation is repeated fifteen times as soon as the pressure has reached 9.5 kg./cm.$^2$. All together, 500 supplemental parts of vinyl chloride are added.

After five hours of polymerization, the yield of polymerization is above 94% and the proportion of grafting is 60 percent. It is evident that the proportion of grafting the polymer has been improved by increasing the quantity of vinyl chloride introduced by adding successive fractions of vinyl chloride during the course of polymerization.

EXAMPLE 8

This example demonstrates that the efficiency of grafting and the proportion of grafting of the polymer trunk are improved by reducing the ratio of vinyl chloride/polyethylene existing in the reaction medium during the course of polymerization, and at the same time maintaining the conditions in accordance with the present invention.

In an autoclave of 5 l., equipped with an agitator having blades inclined at 45°, rotating at 450 revolutions per minute, 0.9 parts by weight of poly(vinyl alcohol) are introduced as well as 1,750 parts of water, and then 500 parts of polyethylene B are dispersed in the mixture. Forty percent of a solution of 1.5 parts of lauroyl peroxide are added in 7.5 parts of benzene and 200 parts of vinyl chloride. The reacting medium is then brought to a temperature of 68°C. The prevailing pressure in the autoclave is 8.7 kg./cm.$^2$.

After 105 minutes of reaction, an additional 15% of the catalyst solution and 75 parts of vinyl chloride are introduced into the reaction mixture. The operation is repeated after another period of 105 minutes and this is done four times.

After 11 hours of reaction, a polymer is obtained in which the proportion of grafting is 56 percent.

The yield of the reaction is above 90 percent.

EXAMPLE R9

In a 30 l. autoclave, equipped with a two-blade agitator inclined at 45°, there is introduced 0.9 parts by weight of poly(vinyl alcohol), 1750 parts of water and 550 parts of polyethylene B is dispersed in the mixture.

After having added 0.225 parts of diethyl peroxydicarbonate, 450 parts of vinyl chloride are introduced. The autoclave is then heated at 52°C. For one hour, the pressure level is equal to the saturated vapor pressure of the vinyl chloride, after which the pressure drops slowly.

After six hours of reaction, a product is obtained having a proportion of grafting of 43 percent.

The yield of the reaction is 73 percent.

The product obtained contains agglomerates of polyethylene grafted with granules of poly(vinyl chloride) connected to each other by homopolymeric poly(vinyl chloride) which has been polymerized outside of the polyethylene grains. The characteristics of the product thus obtained clearly demonstrates the influence on the granulometry of the grafted product as well as on the polymer itself which is to be grafted of the presence of an excess of vinyl chloride as compared to the saturation of the grains of polyethylene in accordance with the present process.

On the other hand, the presence of a level pressure during the polymerization clearly indicates that the pressure prevailing in the autoclave at the beginning of the reaction was equal to the pressure of the saturated vapor of the vinyl chloride at 52°C., which explains the formation of poly(vinyl chloride) outside of the grains of polyethylene.

EXAMPLE 10

This example illustrates the grafting copolymerization of vinyl chloride and vinylidene chloride in the presence of polyethylene.

In an autoclave of 16 l., equipped with a three-blade agitator rotating at a speed of 275 revolutions per minute, the following is introduced: Nine tenths parts by weight of poly(vinyl alcohol), 1750 parts of water and 500 parts of polyethylene B are dispersed in the mixture. There is then added 1.5 parts of lauroyl peroxide and 333 parts of vinyl chloride (1660 grams) as well as 50 parts of vinylidene chloride. The autoclave is then brought to a temperature of 68°C. The prevailing pressure in the autoclave is 9 kg./cm.$^2$.

There is then introduced every hour, 16.7 parts of vinylidene chloride; the total number of such introductions is 7.

After 4 hours of reaction, 1.5 parts of lauroyl peroxide are added.

The polymerization reaction is stopped after a period of 8¾ hours of reaction and a grafted polymer is obtained having a proportion of grafting of 38% and the yield of polymerization is over 93 percent.

EXAMPLES 11 TO R14

The polymerization of vinyl chloride is carried out in the presence of different trunk polymers, namely, the polymers of ethylene designated D, E, F and G, the characteristics of which have been described in Table 1.

The polymerization technique employed is the same as that of Examples 1 to 6, but only part of the vinyl chloride is introduced at the beginning of the reaction, the rest being added in successive fractions during the course of polymerization, so that the pressure of the vinyl chloride vapor always remains lower than its saturated vapor pressure at the temperature of polymerization.

The various components introduced in the autoclave as well as their proportions are set forth in Table 4.

Table 4

| Constituents, parts by weight | Examples | 11 | 12 | 13 | R14 |
|---|---|---|---|---|---|
| Vinyl chloride | | | | 500 | |
| Polymer of Ethylene | D | 500 | | | |
|  | E | | 500 | | |
|  | F | | | 500 | |
|  | G | | | | 500 |
| Water | | | | 1750 | |
| Poly(vinyl alcohol) | | | | 3.6 | |
| Lauroyl peroxide | | | | 1.5 | |
| Temperature of reaction, | °C. | | | 68 | |
| Period of reaction, | hours | 3.5 | 4.5 | 8 | 8 |
| Yield of polymerization, | % | 87 | 90 | 90 | 80 |
| Proportion of grafting | % | 40 | 33 | 60 | <15 | grafted trunk with cyclohexane, and are given in Table 5.

Table 5

| Examples | 15 | 16 | 17 |
|---|---|---|---|
| Polyethylene | O | P | C |
| Proportion of grafting, % | 67 | 60 | 55 |

The degree of grafting is then calculated in accordance with the following formula $t = (A-B/A) \times 100$, in which A is the total weight A of the backbone polymer in the sample and B is the weight of the non-grafted backbone polymer.

The high degree of grafting obtained is clearly evident.

Example R14 shows clearly that with a polymer of ethylene which does not meet the features or characteristics which are required according to the present invention, the proportion of grafting the resultant polymer is very low.

EXAMPLES 15 TO 17

The polymerization of vinyl chloride is carried out in the presence of different trunk polymers designated O, P and C, the characteristics of which are set forth in Table 1 in accordance with the following polymerization technique:

In an autoclave of 30 l., equipped with a two-blade agitator inclined at 45°, there is introduced 1,500 parts by weight of water, 0.8 parts by weight of poly(vinyl alcohol) and 1000 parts by weight of polyethylene are dispersed in the mixture. There is then added 3 parts by weight of lauroyl peroxide and 5 parts by weight of epoxidized soybean oil.

There is then introduced 600 parts by weight of vinyl chloride. This quantity is such that at the temperature of polymerization (62°C.) the partial pressure of the vinyl chloride prevailing in the autoclave is lower than the saturated vapor pressure of the vinyl chloride, namely, 10.2 kg./cm.². As soon as the temperature of reaction is reached, the pressure drops and is brought back to its initial point by four successive additions of 100 parts by weight of vinyl chloride. After six hours of reaction, the pressure drops to below 6 kg./cm.².

The non-polymerized vinyl chloride is then degassed and a product is collected and the proportion of grafting is determined. The yield of the polymerization is approximately 90 percent, and no crusting is observed on the walls of the reactor. The proportion of grafting ($\tau$) of the products is determined by extraction of the non-

EXAMPLE 18

The polymerization of vinyl chloride is carried out in the presence of polyethylene B and in the absence of water and a suspension agent.

In an autoclave of 1 l., there is introduced 500 parts of polyethylene B, 2 parts of lauroyl peroxide and vinyl chloride in a quantity such that at the temperature of polymerization of 62°C., the partial pressure of the vinyl chloride prevailing in the autoclave is lower than the saturated vapor pressure of the vinyl chloride at 62°C. No liquid phase is observed in the polymerization reactor and the reacting mixture acts like a dry "free-flowing" powder. As soon as the reaction starts, a drop in pressure is observed which is compensated by the successive introductions of vinyl chloride regulated in such a manner as to maintain the pressure at about 8 kg./cm.². After seven hours of reaction, the non-transformed vinyl chloride is degassed and a free-flowing powder is collected which does not require centrifugal drying or regular drying.

The polymer obtained has a degree of grafting of 44 percent. Moreover, no build-up is observed in the reactor.

EXAMPLE 19

The polymerization of vinyl chloride is carried out in an autoclave of 5 l., in the presence of plates having a thickness of from 1.5 and 3 mm., of the ethylene polymer C, prestabilized with the aid of 1 percent diphenyldecyl phosphite and arranged in star formation around the axis of the agitator.

After having added a quantity of a solution of poly(vinyl alcohol) in water (0.1 g./kg. of water) to the extent that the polyethylene plates are immersed, lauroyl peroxide (2 g./kg. of vinyl chloride) is introduced and the vinyl chloride is added in such a manner that the prevailing pressure in the autoclave at the temperature of polymerization (62°C.) is equal to 6 kg./cm.$^2$.

The pressure is maintained between 6 and 8 kg./cm.$^2$ during the course of the reaction by means of the successive introductions of vinyl chloride.

After six hours of reaction, the non-transformed vinyl chloride is degassed and plates are collected containing 100 grams of partially grafted poly(vinyl chloride) per kg. of the product.

EXAMPLE 20

The polymerization of vinyl chloride is carried out in the presence of polyethylene by reducing the ratio of water/vinyl chloride plus polymer trunk and by adding a stabilizer to the polymerization medium. By carrying out the operation in this manner, the productivity of the autoclave is increased and the costs of drying the final product as well as the amount of suspension agent employed are reduced.

In an autoclave of 30 l., equipped with a two-blade agitator inclined at 45°, 750 parts of water, 0.4 parts of poly(vinyl alcohol) and 500 parts of polyethylene C are dispersed. After having added 1.5 parts of lauroyl peroxide and 2.5 parts of epoxidized soybean oil as a stabilizer, 300 parts of vinyl chloride (7440 grams) are introduced. The autoclave is then heated at 62°C. and the pressure prevailing therein is 9.5 kg./cm.$^2$. From the start of the reaction the pressure drops, and it is then brought to its initial limit by four successive additions of 50 parts of vinyl chloride.

After six hours of reaction, a product is obtained having a proportion of grafting of 45 percent. The yield of the polymerization is 93 percent.

EXAMPLES 21 TO 43

Mixtures with a base of grafted polymers which are obtained in accordance with the foregoing examples are incorporated into poly(vinyl chloride) obtained by means of polymerization in suspension and having a number K measured in cyclohexanone solution equal to 71 in such a manner that the content in polyolefin in the mixture is equal to 7.5 percent, that is, 15 percent by weight of the product having a grafted polymer base.

As a matter of comparison, mixtures of PVC containing 7.5 percent of non-grafted trunk polymers are also prepared (Examples R21 to R28).

After malaxation on a cylinder malaxator during a period of five minutes at 180°C. in the presence of standard ingredients, a crepe is obtained which is transformed into plates by pressing at 190°C. for a period of five minutes.

The following properties are then measured on these plates:

IZOD resistance to shock at room temperature of 20°C., in accordance with the ASTM D 256/56 Standards;

light transmission on plates having a thickness of 2 mm. in accordance with the ASTM 1003/61 Standards.

The results of these tests are indicated in Table 6 and clearly demonstrate that the grafted polymers according to the invention increase the resistance to shock of the compounds having a base of poly(vinyl chloride) and that the latter have a transparency and a resistance to shock which is improved as compared with non-grafted mixtures.

The incorporation of the polymer obtained in Example R14 with poly(vinyl chloride) wherein the trunk polymer which does not meet the requirements of the present invention does not have a favorable effect on the resistance to shock and the transparency of the grafted composition, as compared to the non-grafted composition.

TABLE 6

| Examples | Composition of the Mixture | | Light Transmission according to ASTM 1003/61 | | IZOD Resistance to Shock according to ASTM D 256/56 kg.cm./cm. |
|---|---|---|---|---|---|
| | | | % of Transmission | % Haze | |
| R21 | Poly(vinyl chloride) | | 84 | 16 | 3.5 |
| R22 | | A | 40 | 100 | 7.5 |
| R23 | Poly(vinyl chloride) + 7.5% of polyolefin | B | 42 | 100 | 8 |
| R24 | | C | 39 | 100 | 9 |
| R25 | | D | 59 | 100 | 6.5 |
| R26 | | E | 70 | 92 | 5 |
| R27 | | F | 62 | 100 | 4.5 |
| R28 | | G | 73 | 75 | 3.5 |
| 29 | Poly(vinyl chloride) + Product obtained in the examples | 1 | 47 | 98 | 14 |
| 30 | | 2 | 47 | 95 | 10 |
| 31 | | 3 | 51 | 93 | 14 |
| 32 | | 4 | 49 | 92 | 11.5 |
| 33 | | 5 | 49 | 89 | 12 |
| 34 | | 6 | 53 | 86 | 16 |
| 35 | | 7 | 57 | 70 | 15 |
| 36 | | 8 | 59 | 79 | 14 |
| 37 | | 9 | 53 | 91 | 8 |
| 38 | | 10 | 37 | 91 | 6.5 |
| 39 | | 11 | 63 | 92 | 8.5 |
| 40 | | 12 | 74 | 51 | 6 |
| 41 | | 13 | 77 | 35 | 6.5 |
| 42 | | 14 | 70 | 88 | 3.5 |
| 43 | | 18 | 56 | 87 | 11 |
| | | 20 | 59 | 83 | 16 |

EXAMPLES 44 AND 45

In these examples, the technique of polymerization is the same as that of Examples 15 and 17.

The yield of the polymerization is approximately 90 percent and no build-up is observed on the walls of the reactor.

The proportions of grafting ($\tau$) of the products are determined by means of the extraction of the non-grafted trunk of cyclohexane. The proportions of grafting are given in Table 7.

Table 7

| Examples | 44 | 45 |
|---|---|---|
| Polyethylene | M | N |
| Proportion of grafting, % | 85 | 80 |

The high proportion of grafting when using polyethylenes having a fusion index below 0.3 is evident. The degree of grafting is calculated as described above.

EXAMPLES 46 TO 48

The grafted polymer obtained in accordance with Example 45 is incorporated into poly(vinyl chloride) obtained by polymerization in suspension and having a K number measured in 1,2-dichlorethane solution equal to 66, so that the content in polyolefin in the mixture is equal to 7.5 percent (Example 46) and 10 percent (Example 47) respectively, that is, 15 and 20 percent by weight of the product is grafted polymer.

As a matter of comparison, a mixture of poly(vinyl chloride) is prepared containing 7.5 percent by weight of the polymer of non-grafted ethylene N (Example R48)

After malaxation on a cylinder malaxor for a period of 5 minutes at 180°C. in the presence of standard ingredients, a crepe is obtained which is transformed into plates by pressing at 190°C. for a period of 5 minutes.

The following properties are then measured on these plates: resistance to shock IZOD at the room temperature of 20°C. in accordance with the ASTM D 256/56 Standards.

light transmission on plates having a thickness of 2 mm. in accordance with the ASTM 1003/61 Standards.

The results of these tests are indicated in Table 8. and demonstrate that the grafted polymers according to the invention increase the resistance to shock of the poly(vinyl chloride) and assure an improved transparency.

With equal transparency, these products can have a higher proportion of poly(vinyl chloride) and consequently the result is products having an even higher resistance to shock.

In addition thereto, the products according to the invention have a transparency and a resistance to shock greatly improved as compared to the non-grafted mixtures.

TABLE 8

| Examples | Composition of Mixture | | Proportion of polyolefin in the mixture % by weight | Light Transmission according to ASTM 1003/61 | | IZOD Resistance to Shock according to ASTM D 256/56 kg.cm./cm. |
|---|---|---|---|---|---|---|
| | Nature | Quantity of grafted product in the mixture, % by weight | | % of transmission | % haze | |
| 46 | Poly(vinyl chloride) + plus product obtained in example 45 | 15 | 7.5 | 66 | 72 | 15 |
| 47 | 45 | 20 | 10 | 60 | 80 | 19 |
| R48 | Poly(vinyl chloride) + 7.5% of polyethylene N | — | 7.5 | 38 | 100 | 8.5 |

EXAMPLES 49 AND 50

The technique of polymerization employed is the following:

In an autoclave of 30 liters, equipped with a two-blade agitator inclined at 45°, 3,200 parts by weight of water, 1.8 parts by weight of poly(vinyl alcohol) and 1000 parts of polyethylene are introduced and dispersed. Lauroyl peroxide in an amount of 4.2 parts by weight is then added. There is then introduced 600 parts by weight of vinyl chloride. This quantity is such that at the temperature of polymerization (62°C.), the partial pressure of the vinyl chloride prevailing in the autoclave is lower than the saturated vapor pressure of the vinyl chloride, namely, 10.2 kg./cm.$^2$.

As soon as the temperature of reaction (62°C.) is reached, the pressure drops and is brought back to its initial limit by means of four successive additions of 100 parts by weight of vinyl chloride. After six hours of reaction, the pressure drops to below 6 kg./cm.$^2$.

The non-polymerized vinyl chloride is then degassed and a product is collected and the proportion of grafting is determined, by extraction of the non-grafted trunk with cyclohexane. The yield of the polymerization is approximately 90 percent and no crusting is observed on the walls of the reactor.

The proportions of grafting are given in Table 9.

Table 9

| Examples | 49 | 50 |
|---|---|---|
| Polyethylene | K | L |
| Proportion of grafting % | 47 | 50 |

The degree of grafting is calculated as described above.

EXAMPLES 51 TO 53

The products obtained in accordance with Examples 49 and 50 hereinabove are incorporated into poly(vinyl chloride) obtained by polymerization in suspension and having a K number measured in 1,2-dichloroethane equal to 66, in such a manner that the content of polyolefin in the mixture is equal to 7.5 percent, i.e. the mixture contains 15 percent by weight of the grafted product.

After malaxation on a cylinder malaxator for a period of five minutes at 180°C. in the presence of standard ingredients, a crepe is obtained which is cut into fine strips and the apparent viscosity is determined in a Gottfert and Wiedmann viscosimeter.

The results of these tests are set forth in Table 10 and demonstrate that the grafted polymers of the invention improve the fluidity of compositions which have a base of poly(vinyl chloride) and thereby the working of these compounds is greatly facilitated.

(70 kg./cm.$^2$). The severity of the conditions is limited in order that a beautiful object which is not degraded and which is not scorched on the surface or in depth is obtained. The "injection speed" is controlled by the opening of the injection pressure valve. Depending on the size of this opening, this pressure is applied more or less rapidly.

The optimal values of the length of the spirals are compared and the injectability capacity of the products is then determined.

Comparative Example R54 concerns poly(vinyl chloride) containing no additive for improving injectability.

Comparative Example R60 pertains to a mixture of poly(vinyl chloride) and a coumarone-indene resin noted for its fluidifying properties.

Table 10

| Examples | Composition of the Mixtures | | Gottfert & Wiedmann Viscosity at 180°C. and at 100 sec$^{-1}$ |
|---|---|---|---|
| R51 | Poly(vinyl chloride) | | 8.1 |
| 52 | Polyvinyl chloride + | 49 | 4.1 |
| 53 | Products obtained in examples | 50 | 3.2 |

EXAMPLES 54 TO 57

These examples demonstrate the excellent injectability characteristics of compositions having a base of poly(vinyl chloride) and containing the grafted polymers of the invention.

The grafted polymers employed have been obtained as described in Examples 49 and 50 using trunk polymers K and L, the properties of which have been described in Table 1.

The results of the tests are set forth in Table 11 and clearly demonstrate that the injectability has been improved by 40 % by means of the present grafted products compared with that of poly(vinyl chloride) without an additive, and an injectability capacity is reached which is equivalent to that of a compound containing a coumarone-indene resin. In addition, the excellent properties of resistance to shock (ASTM D 256/56 Test on injected bars) are retained.

Table 11

| Examples | | R54 | R55 | 56 | 57 |
|---|---|---|---|---|---|
| Composition, g. | | | | | |
| Poly(vinyl chloride) K number = | 53 | 100 | 94 | 87 | 87 |
| Products obtained in examples | 49 | — | — | 13 | — |
| | 50 | — | — | — | 13 |
| Coumarone-indene resin | | — | 6 | — | — |
| Lead stabilizer | | 4.4 | 4.4 | 4.4 | 4.4 |
| Epoxidized soybean oil | | 4 | 4 | 4 | 4 |
| Properties | | | | | |
| Length of the spiral cm. | | 19 | 27 | 26 | 27 |
| IZOD resistance to shock (20°C.) according to ASTM D 256/56,kg.cm./cm.of notch | | 2.8 | 2.5 | 4.3 | 4.1 |
| Appearance of injected objects | | Beautiful | | | |

Starting with the compounds indicated hereinbelow, the spiral injection test is carried out to determine the injectability of the compounds by measuring the length of injected spirals.

This test consists of injecting on an injection press of the Ankerwerk type an object the form of which is a spiral with an unspecified length. This spiral is formed by a band 20 mm. wide by 1.6 mm. thick wound on its width according to an arithmetical spiral with a spread of 10 mm. The injection is made through the center, and the distance covered by the product is measured under the standard conditions of mold temperature (40°C.). The injection is carried out at the maximum heat possible for the product, at the maximum possible injection speed and at the maximum injection pressure

EXAMPLES 58 TO 61

These examples pertain to high temperature grafting polymerization. The parameters and proportions of reagents and results are given in Table 12.

The technique of polymerization employed is as follows:

In an autoclave equipped with a two-blade agitator inclined at 45°, there is introduced water, a suspension agent, poly(vinyl alcohol) and the polyethylene is dispersed. After adding lauroyl peroxide and epoxidized soybean oil, the charge of vinyl chloride is then introduced. The reaction medium is brought to the desired temperature of polymerization, the partial pressure of the vinyl chloride reamining at all times lower than the saturated vapor pressure of the vinyl chloride at the selected temperature of polymerization. As soon as the reaction temperature is reached, the pressure drops and as soon as it is stabilized, the polymerization is stopped and the grafted product is collected. No crusting is observed on the walls of the reactor.

The proportion of grafting ($\tau$) of the products which are obtained is determined by means of the extraction of the non-grafted trunk in cyclohexane. The proportion of grafting is then calculated in accordance with the usual formula, $\tau = (A-B/A) \times 100$, in which A is the total weight of the polymer trunk in the sample and B is the weight of the non-grafted polymer trunk.

The proportions of grafting for each example are set forth in Table 12. The grafted polymer products are in the form of a powder, the granulometery of which is below 1,000$\mu$.

obtained by means of polymerization in suspension and having a K number measured in 1,2-dichloroethane equal to 66, in such an amount that the content of polyethylene in the mixture is equal to 7.5 percent by weight and the content of grafted product is 15 percent by weight.

Example R62 given as a matter of comparison pertains to poly(vinyl chloride) not containing a grafted polymer.

After malaxation on a cylinder malaxor during a period of 5 minutes at 180°C. in the presence of standard ingredients, a crepe is obtained which is cut into fine strips; the apparent viscosity is determined at 180°C. in a Gottfert and Wiedmann viscosimeter.

The results of these tests are set forth in Table 13 and clearly demonstrate that the grafted polymers obtained Table 12

| | Examples | 58 | 59 | 60 | 61 |
|---|---|---|---|---|---|
| Reagents parts by weight | Vinyl chloride | 500 | 500 | 600 | 600 |
| | Polyethylene R | 500 | 500 | — | — |
| | Polyethylene C | — | — | 400 | 400 |
| | Water | 2000 | 2000 | 2000 | 2000 |
| | Poly(vinyl alcohol) | 4 | 4 | 4 | 4 |
| | Benzoyl peroxide | 1 | 0.5 | 1.2 | 0.6 |
| | Epoxidized Soybean epoxide | 2.5 | 2.5 | 3 | 3 |
| Conditions of Polymerization | Temperature, °C | 90 | 100 | 90 | 100 |
| | Volume of autoclave, liters | 5 | 5 | 5 | 5 |
| | Agitation, rev./minute | 450 | 450 | 450 | 450 |
| | Maximum partial pressure of vinyl chloride kg/cm$^2$ | 17 | 20.5 | 16.8 | 20.7 |
| | Saturated vapor pressure of vinyl chloride at the temperature of polymerization kg./cm.$^2$ | 18 | 21.4 | 18 | 21.4 |
| | Final pressure of polymerization kg./cm.$^2$ | 6 | 7.5 | 6.4 | 7.7 |
| | Period of polymerization, h./min. | 2.10 | 2 | 2 | 1.55 |
| | Yield, % | 80 | 85 | 88 | 85 |
| | Weight of vinyl chloride polymerized | 610 | 600 | 730 | 720 |
| Form of the product | | Powder | Powder | Powder | Powder |
| Proportion of grafting, % | | 40 | 43 | 45 | 40 |

EXAMPLES 62 TO 66

The products obtained in accordance with Examples 58 to 61 are incorporated into a poly(vinyl chloride), at a high temperature improve the fluidity of melted poly(vinyl chloride) which thereby facilitates the working of these compounds.

Table 13

| Examples | Composition of the Mixture | Preparation of Grafted Polymers Temperature of Polymerization | Polyethylene Type | Gottfert & Wiedmann Viscosity at 180°C. at 100 sec$^{-1}$ (poises x 10$^{-4}$) |
|---|---|---|---|---|
| R62 | Poly(vinyl chloride) | — | — | 8.1 |
| 63 | Poly(vinyl chloride) + product obtained in Examples { 58 | 90 | C | 4.4 |
| 64 | { 59 | 100 | C | 4 |
| 65 | Poly(vinyl chloride) + product obtained in Examples { 60 | 90 | R | 3.3 |
| 66 | { 61 | 100 | R | 3 |

The results of the tests set forth in Table 13 demonstrate that the grafted polymers according to the present invention decrease the viscosity, in melted form, of the mixtures thereof with poly(vinyl chloride)

It is normal for the voscosity of the composition obtained in accordance with Examples 65 and 66 to be lower than those of Examples 63 and 64, in view of the fact that the employment of polyethylene having a high fusion index for the production of grafted polymers decreases the viscosity, in melted form, of the mixtures of these polymers grafted with poly(vinyl chloride).

It should be pointed out, and this is one of the objects of the invention, that the application of high temperatures in the production of grafted polymers further decreases the viscosity, in melted form, of mixtures thereof with polymers of vinyl chloride and consequently, further facilitates the processing of these mixtures and makes it possible to work with them at lower temperatures which improves the thermal stability and the initial color of the finished products and also increases the productivity of the operations without any risk of deterioration of the polymer.

The shock resistance test called H50 is made on a series of samples of 100 bottles selected at random from the production. A first bottle, filled with water at 20°C. and plugged, is allowed to fall from a height, estimated by an approximation method, on a flat anvil, free of water film. The bottles are guided by 6 fine nylon wires until the impact. The second bottle is allowed to fall 10 cm. above the preceding level if the first bottle has not withstood the drop, and so on. The average height which is necessary in order to have 50% of the bottles broken is then calculated. This value is set forth in Table 14.

Examples R67 and R68 are given for comparison.

Table 14

| Examples | R67 | R68 | 69 | 70 |
|---|---|---|---|---|
| Composition, g. | | | | |
| Poly(vinyl chloride)  K number = 53 | 100 | 87 | 87 | — |
| Poly(vinyl chloride)  K number = 60 | — | — | — | 87 |
| Product of the present grafted polymer | — | — | 13 | 13 |
| KUREHA BTA III | — | 13 | — | — |
| PARALOID K 120 N | — | 1 | — | — |
| Properties | | | | |
| Resistance to shock    height, m. | 0.8 | 1.33 | 1.5 | 2.3 |
| Rate of production    bottles/hour | 500 | 500 | 650 | 550 |

EXAMPLES 67 TO 70

These examples demonstrate high resistance to shock and the improved workability of compositions containing the grafted polymers according to the present invention in combination with low and high molecular weight poly(vinyl chloride).

It will be noted that resistance to shock of compositions containing the present grafted polymer is greater than that obtained by using well known reinforcing agents such as a grafted methacrylate polymer of methylmethacrylate-butadiene-styrene copolymer (KUREHA BTA III). The same holds true regarding the workability, the grafted polymers of the invention have proved to be superior to those of the well known "processing-aid" agents such as PARALOID K 120 N.

The grafted polymer employed has been obtained with the aid of polyethylene B and in accordance with the method described in Examples 49 and 50.

The characteristics of the poly(vinyl chlorides) which have been employed are set forth in Table 14. The stabilization of the resins is obtained by means of the addition of 1.5 parts of an octyltin mercaptide. The lubricant incorporated at the ratio of 1 part is an ester of montanic acid containing 20 percent calcium montanate.

The bottles having a capacity of 1,000 cm.³ have been obtained with the aid of a BEKUM HDB 110 type extruder. The very high rate of production of the bottles is clearly attributed to the presence of the grafted compounds according to the present invention.

What we claim as new and desire to secure by letters patent is:

1. Process for preparing grafted polymers of vinyl chloride in which vinyl chloride is polymerized or copolymerized in the presence of solid ethylene backbone polymer selected from the group consisting of polyethylene, a copolymer of ethylene with a minor quantity of another $\alpha$-olefin and a combination thereof, said ethylene backbone polymer being present in an amount of about 25 to 99 percent by weight of the final grafted product, which comprises carrying out the polymerization in the presence of a polymer of ethylene having a fusion index $\leq 250$, and having either the characteristic of from 0.2 to 4 double bonds per 1,000 carbon atoms or the characteristic from 5 to 30 methyl groups per 1,000 carbon atoms, or both of said characteristics at a temperature of about 40° to 110°C, and under a partial pressure of vinyl chloride which is lower at all times than the saturated vapor pressure of vinyl chloride at the temperature of polymerization, the proportion of ethylene polymer to vinyl chloride being dependent on the capacity of said ethylene polymer for absorbing vinyl chloride and said proportion being such that substantially all of the vinyl chloride is absorbed by the ethylene polymer, whereby substantially all of said vinyl chloride is polymerized in direct contact with said ethylene polymer.

2. Process for obtaining grafted polymers of vinyl chloride in accordance with claim 1 in which the fusion index of the polymer of ethylene is between 0.1 and 0.3.

3. Process for obtaining grafted polymers of vinyl chloride in accordance with claim 1 in which the fusion index of the polymer of ethylene is between 0.3 and 40.

4. Process for obtaining grafted polymers of vinyl chloride in accordance with claim 1 in which the fusion index of the polymer of ethylene is between 40 and 200.

5. Process for obtaining grafted polymers of vinyl chloride in accordance with claim 1 in which the polymerization is carried out at a temperature of 80° to 110°C.

6. Process in accordance with claim 1 in which the backbone polymer is in the form of granules, powder, fluff, fibers, plates or films.

7. Process in accordance with claim 1 in which additional vinyl chloride is introduced during the course of the polymerization reaction either in a continuous manner or in successive portions.

8. Process in accordance with claim 1 in which the polymerization is carried out in bulk, in the absence of a liquid phase.

9. Process in accordance with claim 1 in which the polymerization is carried out in the presence of a stabilizer of poly(vinyl chloride).

10. Process in accordance with claim 1 in which the polymerization is carried out in an aqueous suspension in the presence of a suspension agent.

11. A process in accordance with claim 1 in which siad polymerization is carried out in aqueous suspension.

* * * * *